United States Patent
Chung

(10) Patent No.: US 11,218,255 B2
(45) Date of Patent: Jan. 4, 2022

(54) WIRELESS DATA COMMUNICATION SYSTEM AND METHOD

(71) Applicant: MARS SEMICONDUCTOR CORP, Hsinchu (TW)

(72) Inventor: Ming-Liang Chung, Hsinchu (TW)

(73) Assignee: Mars Semiconductor Corp., Hsinchu (TW)

( * ) Notice: Subject to any disclaimer, the term of this patent is extended or adjusted under 35 U.S.C. 154(b) by 91 days.

(21) Appl. No.: 16/745,635

(22) Filed: Jan. 17, 2020

(65) Prior Publication Data

US 2020/0153557 A1 May 14, 2020

Related U.S. Application Data

(63) Continuation-in-part of application No. 15/928,255, filed on Mar. 22, 2018, now abandoned.

(51) Int. Cl.
*H04L 1/18* (2006.01)
*H04W 72/04* (2009.01)

(52) U.S. Cl.
CPC ....... *H04L 1/1812* (2013.01); *H04W 72/0446* (2013.01)

(58) Field of Classification Search
CPC ........... H04L 1/1812; H04L 2001/0092; H04L 1/1864; H04L 74/06; H04W 72/0446
See application file for complete search history.

(56) References Cited

U.S. PATENT DOCUMENTS

| | | | |
|---|---|---|---|
| 2006/0159054 A1* | 7/2006 | Kobayashi | H04L 45/64 370/338 |
| 2008/0049718 A1* | 2/2008 | Chindapol | H04B 7/15592 370/351 |
| 2010/0027487 A1* | 2/2010 | Ihm | H04B 7/0452 370/329 |
| 2010/0257420 A1* | 10/2010 | Chen | H04L 1/1867 714/748 |
| 2012/0008545 A1* | 1/2012 | Zhang | H04L 1/1829 370/315 |
| 2018/0084456 A1* | 3/2018 | Gostev | H04W 84/18 |
| 2021/0083804 A1* | 3/2021 | Zhou | H04L 1/1607 |

* cited by examiner

*Primary Examiner* — Yaotang Wang
(74) *Attorney, Agent, or Firm* — Rosenberg, Klein & Lee

(57) ABSTRACT

A wireless data communication system and method are illustrated. The wireless data communication system has a central communication device and multiple communication devices, wherein the communication devices are able to communicate with the central communication device. The central communication device requests one of the communication devices to transmit one or more packets to the central communication device; if the central communication device determines at least one of the packets of the communication device is lost during transmission, and another one of the communication devices receives the one or more lost packets of the communication device, the other one communication device retransmits the one or more lost packets of the communication device to the central communication device after being requested by the central communication device. Thereby, the retransmission efficiency of packet loss can be enhanced and the transmission efficiency of radio frequency can be improved.

10 Claims, 4 Drawing Sheets

WIRELESS DATA COMMUNICATION SYSTEM AND METHOD

REFERENCE TO RELATED APPLICATIONS

This application is a continuation of application Ser. No. 15/928,255, which is filed on Mar. 22, 2018. All of the above-referenced applications are hereby incorporated herein by reference in their entirety.

TECHNICAL FIELD

The present disclosure relates to a wireless communication technology, and more particularly, to a wireless data communication system and a wireless data communication method, having high transmission efficiency and improving the retransmission efficiency of packet loss.

BACKGROUND

Nowadays, wireless communication has reached a quite high level both in technology and application, and is now widely used in radio, smart phones, personal digital assistants, wireless networks, global positioning systems, remote controls, wireless 3C products, etc. The basic concept is that multiple communication nodes can perform a long-distance transmission, without a physical connection.

Regarding the wireless communication technology, packet radio has been developed. Packet radio is a form of packet switching technology used to transmit digital data via wireless communications. Packet radio uses the same concepts of data transmission using datagrams that are fundamental to communications on the Internet. Packet radio can be used over long distances without the need for a physical connection between stations. Packet radio is a great leap forward for the wireless communication technology.

However, packet radio has its shortcomings in actual operation. The most common one is that once a packet is lost during transmission, the transmission of data will be incomplete. In the worst case, the overall transmission may be lost. Refer to FIG. 1, and FIG. 1 is a schematic diagram showing a conventional radio frequency communication system. In FIG. 1, the conventional radio frequency communication system 1 has a plurality of communication devices 111-113 and a central communication device 12, and the central communication device 12 has a coverage CR. When the communication devices 111-113 are located in the coverage CR of the central communication device 12, the communication devices 111-113 can communicate with and transmit at least one of packets to the central communication device 12.

However, when a noise (such as, an interference generated by an interference source or other electronic device) affects the transmission of the communication device 111 severely or the communication device 111 moves to depart away from the central communication device 12, at least one of the packets which the communication device 111 transmits to the central communication device 12 during the transmission may be lost. Generally, when the packet is lost, the communication device 111 retransmits the lost packet to the central communication device 12 after the communication device 111 is notified, but unfortunately, the retransmitted packet may be still lost if the communication device 111 is interfered severely or outside of the coverage CR of the central communication device 12.

Though, a relay device or repeater (not shown in drawings) can be disposed in the conventional radio frequency communication system 1 to help to retransmit all of the packets to be transmitted by one of the communication devices 111-113, the relay device or repeater can merely relay the packets, and is not the same as the communication devices 111-113 which can generate packets to be transmitted to the central communication device 12. Thus, the retransmission efficiency of packet loss and the transmission efficiency of packet transmission are not sufficient.

SUMMARY

The primary object of the present disclosure is to establish a complete wireless communication mechanism to make the transmission from communication devices to a central communication device more efficient and to improve the retransmission efficiency of packet loss during transmission.

According to one aspect of the present disclosure, a wireless data communication system is provided. The wireless data communication system comprises a central communication device and a plurality of communication devices. The communication devices are capable of communicating with the central communication device. The central communication device requests one of the communication devices to transmit one or more packets to the central communication device. If the central communication device determines at least one of the packets of the communication device is lost during transmission, and another one of the communication devices receives the one or more lost packets of the communication device, the other one communication device retransmits the one or more lost packets of the communication device to the central communication device after being requested by the central communication device.

Preferably, the communication device retransmits the one or more lost packets of the communication device to the central communication device when the communication device is notified that the one or more packets of the communication device are is lost. The other one communication device retransmits the one or more lost packets of the communication device if the one or more lost packets of the communication device are not successfully retransmitted by the communication device.

Preferably, the central communication device allocates a plurality of time slots to the communication devices, and merely the communication devices are respectively requested within the allocated time slots.

Preferably, numbers of the time slots allocated to the communication devices are different.

Preferably, the time slots are allocated to the communication devices according to at least one of successful retransmission rates, locations, packet error rates, received signal strength indications, signal to noise ratios of the communication devices.

Preferably, the central communication device interrupts a data transmission of the communication device to request the other one communication device which receives the one or more lost packets of the communication device to retransmit the one or more lost packets of the communication device.

Preferably, after the central communication device receives the one or more lost packets of the communication device retransmitted by the other one communication device, the central communication device interrupts a data transmission of the other one communication device to request the communication device transmit the packet next to the one or more lost packets of the communication device.

Preferably, if a central communication device determines at least one of the packets of the communication device requested by and transmitted to the central communication device is lost during transmission, the central communication device broadcasts a notification message of the one or more lost packets of the communication device to the at least one portion of the communication devices.

Preferably, the central communication device records information which other communication devices are able to retransmit the one or more lost packets of the communication device.

Preferably, the central communication device determines whether to request the other one communication device which receives the one or more lost packets of the communication device to retransmit the one or more lost packets of the communication device to the central communication device according to at least one of a priority of the one or more lost packets of the communication device, a packet error rate, a successful retransmission rates, a location, a packet error rate, a received signal strength indication, a signal to noise ratio of the other one communication device.

According to one aspect of the present disclosure, a wireless data transmission method is provided. The wireless data transmission method is used in a wireless data communication system comprising a central communication device and a plurality of communication devices, wherein the communication devices are able to communicate with the central communication device, such that the above communication devices and the central communication device are able to perform the above operations.

To sum up, not all of packets are retransmitted, and merely the lost packet is retransmitted by other one communication device which can generate packets to central communication device. Thus, the wireless data communication system and method of the present disclosure can enhance the retransmission efficiency of packet loss and further improve the transmission efficiency.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

Figure 1:
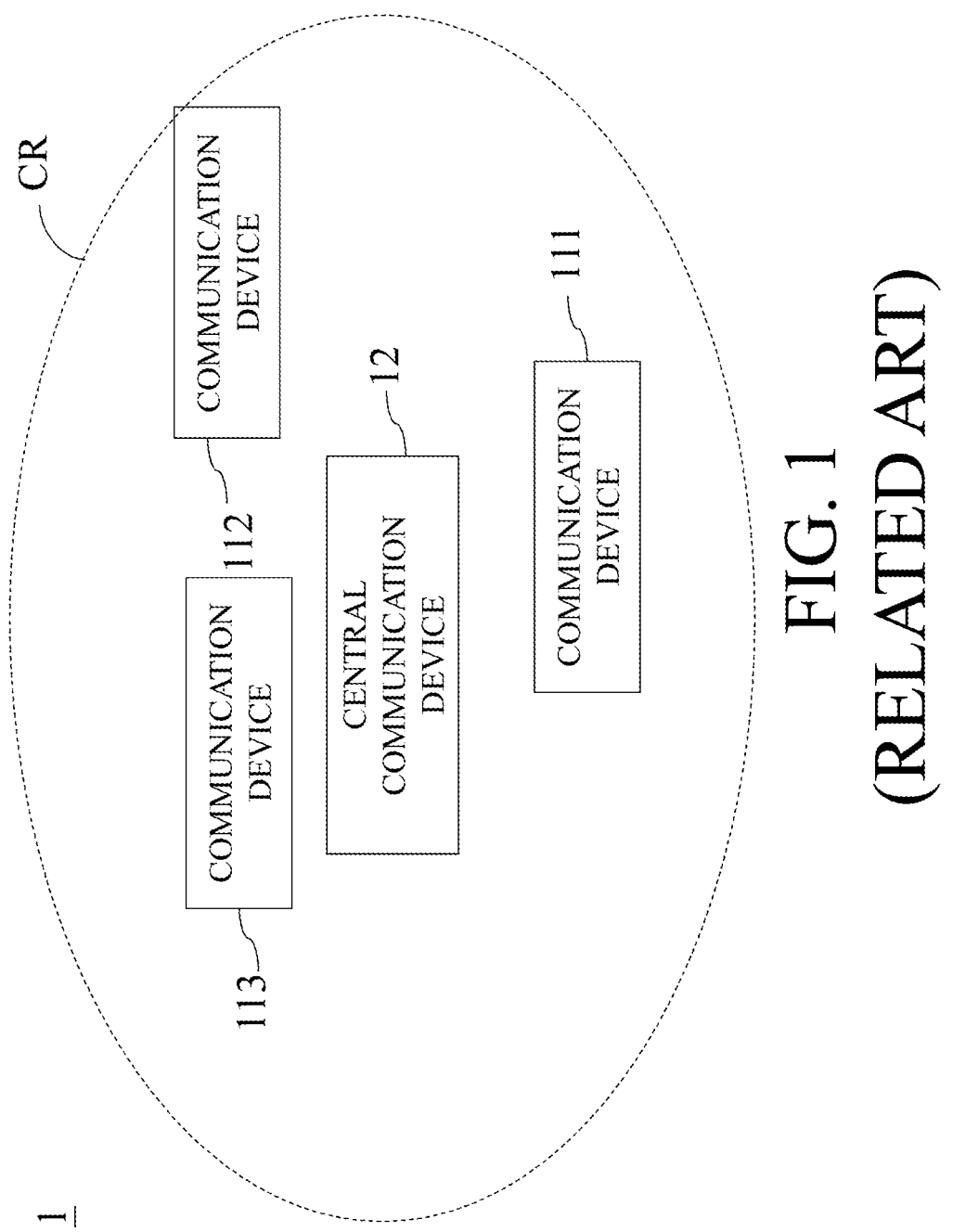
FIG. 1 is a schematic diagram showing a conventional radio frequency transmission system.

Advantages and features of the inventive, concept and methods of accomplishing the same may be understood more readily by reference to the following detailed description of exemplary embodiments and the accompanying drawings. The inventive concept may, however, be embodied in many different forms and should not be construed as being limited to the embodiments set forth herein.

An exemplary embodiment of the present disclosure provides a wireless data communication system, wherein a central communication device in the wireless data communication system is capable of requesting each of multiple communication devices in the wireless data communication system to transmit or retransmit at least one of packets which the central communication device demands. While one of the communication devices fails to transmit one or more packets of the communication device to the central communication device (i.e. the one or more packets of the communication device are lost during transmission), the central communication device request another one of the communication devices which receives the one or more lost packets of the communication device to retransmit the one or more lost packets of the communication device. That is, once the communication device fails to successfully transmit its packets to the central communication device after it is requested, the other one communication device can help to retransmit partial or all of lost packets of the communication device to the central communication device after the other one communication device is requested. Therefore, without being disposed with at least one of relay devices or repeaters, the wireless data communication system can enhance the retransmission efficiency of packet loss and further improve the transmission efficiency.

In an exemplary embodiment, a polling mechanism can be applied in the wireless data communication system. The communication devices in the wireless data communication system respectively have polling time intervals, and each of the polling time intervals has at least one of time slots, which is allocated to the corresponding communication device by the central communication device in the wireless data communication system. The communication device is polled within its polling time interval, and if the communication device has at least one of packets to be transmitted to the central communication device, the central communication device and the communication device negotiate with each other, and a data transmission time interval is allocated to the communication device, such that the communication device transmits one more packets to the central communication device. The other one communication device also receives the packets transmitted by the communication device. If one of the packets transmitted by the communication device is lost, after the other one communication device which has the lost packet is polled within its polling time interval, the other one communication device can retransmit the lost packet to the central communication device within its data transmission time interval.

In another one exemplary embodiment, an interruptive request mechanism is applied in the wireless data communication system. The central communication device can control the one of communication devices to transmit or retransmit the packet and the others of the communication devices to be silent. The central communication device requests the communication device to transmit one more packets to the central communication device, and when the central communication device determines one packet transmitted by the communication device is lost, the central communication device interrupts a data transmission of the communication device to request the other one communication device which has the lost packet to retransmit the lost packet to the central communication device. After the central communication device successfully receives the lost packet retransmitted by the other one communication device, the central communication device interrupts a data transmission of the other one communication device to request the communication device transmit the packet next to the lost packet.

Figure 2:
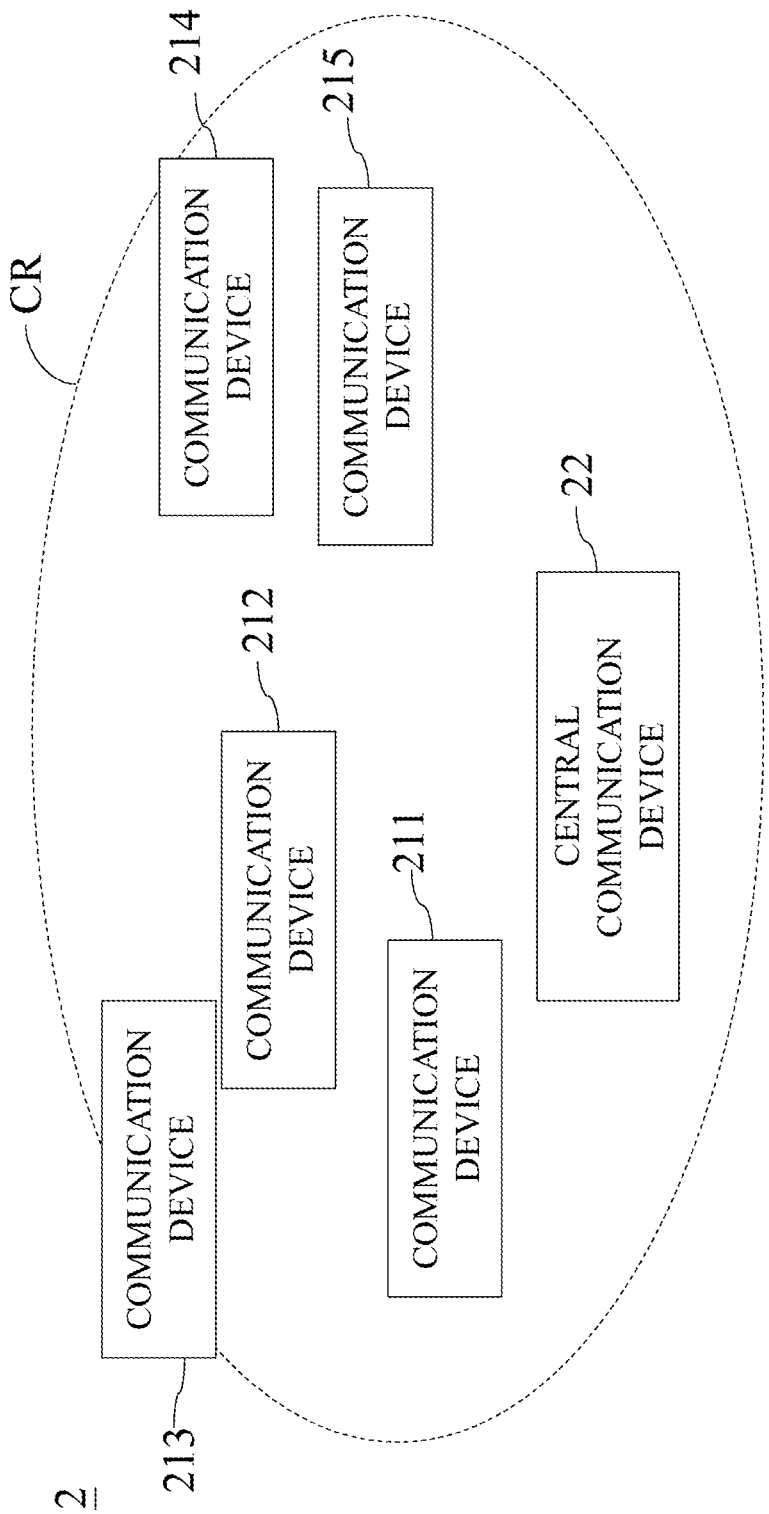
FIG. 2 is an architecture diagram of a wireless data communication system according to an exemplary embodiment of the present disclosure.

Referring to FIG. 2, FIG. 2 is an architecture diagram of a wireless data communication system according to an exemplary embodiment of the present disclosure. The wireless data communication system 2 comprises multiple communication devices 211-215 and a central communication device 22, the central communication device 22 has a coverage CR, and within the coverage CR, the communication devices 211-215 can communicate with the central communication device 22. The number of the communication devices 211-215 in the exemplary embodiment is not used to limit the present disclosure, and the number of the communication devices 211-215 may be varied in another one exemplary embodiment. The central communication device 22 may be a server or other one data collecting device, and the communication devices 211-215 may be webcam, sensors, mobile phones, pads or notebooks. It is noted that the kinds of the central communication devices 22 and the communication devices 211-215 are not used to limit the present disclosure.

Figure 3:
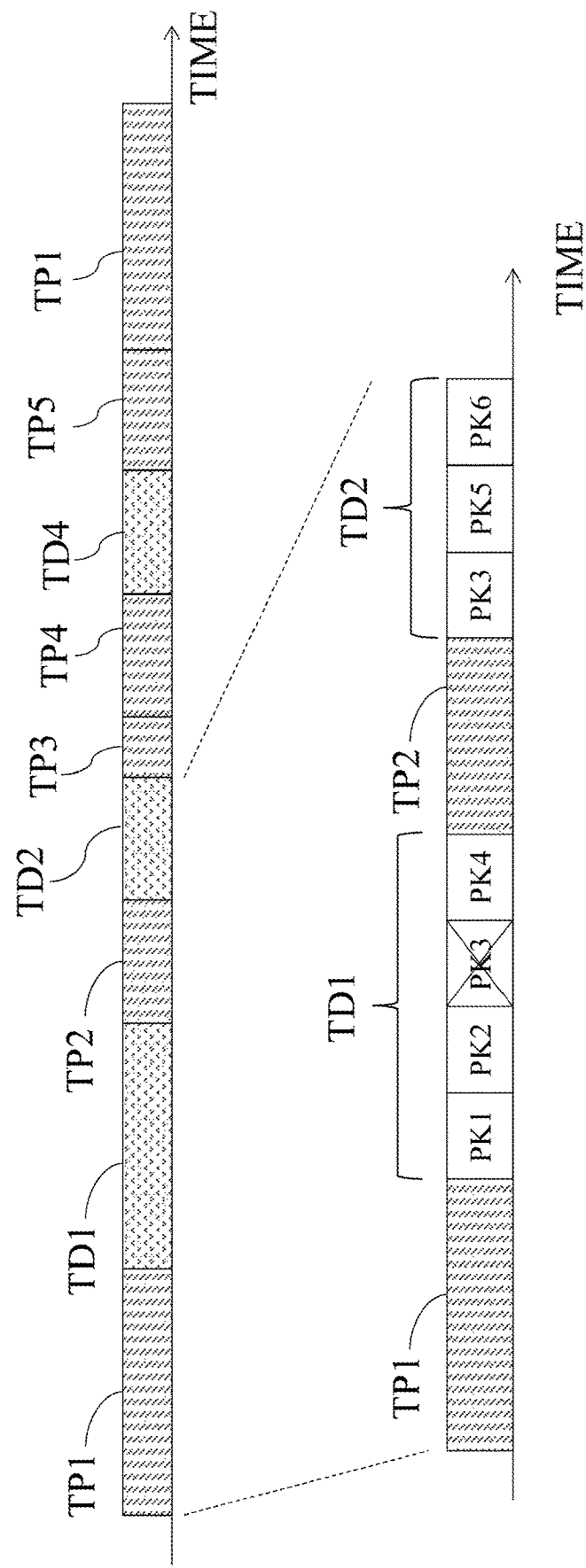
FIG. 3 is a timing chart of a plurality of communication devices according to an exemplary embodiment of the present disclosure.

Referring to FIG. 2 and FIG. 3, FIG. 3 is a timing chart of a plurality of communication devices according to an exemplary embodiment of the present disclosure. In the exemplary embodiment of the present disclosure, the polling mechanism is applied to the wireless data communication system 2. The central communication device 22 allocates time slots for polling to the communication devices 211-215, and thus the communication devices 211-215 have polling time intervals TP1-TP5, each of which is allocated with at least one time slot. For example, the communication device 211 is allocated with 4 time slots for polling (i.e. the polling time interval TP1 has 4 time slots), each of the communication devices 212, 214 and 215 is allocated with 2 time slots for polling (i.e. each of the polling time intervals TP2, TP4 and TP5 has 2 time slots), and the communication device 213 is allocated 1 time slot for polling (i.e. the polling time interval TP3 has 1 time slot). It is noted that the manner of allocation of the time slots is not used to limit the present disclosure. Further, though FIG. 3 shows the communication devices 211-215 are sequentially polled, the present disclosure does not limit the sequence of polling the communication devices 211-215.

Respectively within the polling time intervals TP1-TP5, the communication devices 211-215 are polled by the central communication device 22 whether the communication devices 211-215 have packets to be transmitted or retransmitted to the central communication device 22. If the communication devices 211-215 have packets to be transmitted or retransmitted to the central communication device 22, the communication devices 211-215 can negotiate with the central communication device 22 to allocate data transmission time intervals for transmitting or retransmitting packets. For example, in FIG. 3, except to the communication devices 213 and 215, the communication devices 211, 212 and 214 have packets to be transmitted or retransmitted to the central communication device 22, and the data transmission time intervals TD1, TD2 and TD4 are allocated to the communication devices 211, 212 and 214, such that the communication devices 211, 212 and 214 can transmit or retransmit the packets respectively within the data transmission time intervals TD1, TD2 and TD4.

In FIG. 3, during the polling time interval TP1, the communication device 211 is polled by the central communication device 22 whether the communication device 211 has at least one packet to be transmitted or retransmitted to the central communication device 22. For example, the communication device 211 has 4 packets PK1-PK4 to be transmitted to the central communication device 22, and after the communication device 211 is polled, the polling time interval TP1 is terminated, and the packets PK1-PK4 are transmitted to the central communication device 22 within the data transmission time interval TD1. Unfortunately, the packet PK3 is lost (i.e. not transmitted to the central communication device 22 successfully), but the communication device 212 receives the packet PK3 and temporally stores the packet PK3. It is noted that, during negotiation, the central communication device 22 knows the packets PK1-PK4 should be transmitted by the communication device, and thus, the central communication device 22 knows that the packet PK3 is lost.

Next, during the polling time interval TP2, the communication device 212 is polled by the central communication device 22 whether the communication device 212 has at least one packet to be transmitted or retransmitted to the central communication device 22. In the example, the communication device 212 has the packet PK3 and the packets PK5 and PK6 be transmitted to the central communication device 22, and after the communication device 212 is polled, the communication device 212 knows it has the packet PK3 to be retransmitted to the central communication device 22. Then, the polling time interval TP2 is terminated, and the packets PK3, PK5 and PK6 are transmitted to the central communication device 22 within the data transmission time interval TD2.

From the above descriptions, it can be known that when one of the communication devices (such as, 211) transmits the packet to the central communication device 22, at least one of other communication devices (such as, 212) can receive and temporally store the packet transmitted by the communication device 211. If the packet (such as, PK3) is lost (i.e. not successfully received by the central communication device 22), the communication device 212 can retransmit the lost packet PK3 to the central communication device 22 within the data transmission time interval TD2 after being polled. Further, in other one exemplary embodiment, the data transmission time interval TD1 may design to have a margin time to let the communication device 211 to retransmit the lost packet PK3, and the communication device 212 retransmits the lost packet PK3 merely when the communication device 211 fails to retransmit the lost packet PK3.

Further, the central communication device 22 can record the indices of the packets which communication device 211 transmits to the central communication device 22, therefore, during the polling time interval TP2, the central communication device 22 negotiates with the communication device 212, and the communication device 212 knows it has the packet PK3 which should be retransmitted to the central communication device 22.

The above manner does not uses notification message of the lost packet, such as, a non-acknowledge information, but the present disclosure is not limited thereto. In another one exemplary embodiment, when the packet PK3 transmitted by the communication device 211 is lost, the central communication device 22 can broadcast the notification message of the lost packet PK3 to at least one portion of the communication devices 211-215, and thus when the communication device 212 is polled, the communication devices knows it has the packet PK3 which should be retransmitted to the central communication device 22.

It is noted that FIG. 3 is the timing chart of one of possible examples, and the present disclosure is not limited. For example, the communication devices 213 and 215 may have packets to be transmitted or retransmitted to the central communication device 22, and the communication devices 213 and 215 are allocated with data transmission time intervals. Further, the lost packet PK3 can be retransmitted in another one data transmission time interval (such as, TD3) rather than the data transmission time interval TD2 if the communication device 213 can receive the packet PK3 transmitted by the communication device 211. Moreover, the numbers of the time slots of the communication devices 211-215 can be different or identical, and the numbers of the time slots of the communication devices 211-215 are not used to limit the present disclosure.

Moreover, if the central communication device 22 can know which one or more of the communication devices 211-215 have the better successful retransmission rates, the central communication device 22 can record information which other communication devices are able to retransmit the lost packet. Thus, one or more of the communication devices 211-215 that cannot successfully retransmit the lost packet will not be requested to retransmit the lost packet by the central communication device 22.

That is, whether the retransmission of the lost packet can be performed by the communication device is determined by the central communication device 22. For example, the central communication device 22 can determine the communication device 212 to retransmit the lost packet which is transmitted by the communication device 211 according to at least one of a priority of the lost packet, a packet error rate, a successful retransmission rates, a location, a packet error rate, a received signal strength indication, a signal to noise ratio of the other one communication device 212. If the successful retransmission rate of the communication device 212 is less than that of the communication device 213, the lost packet is transmitted by the communication device 213 rather than the communication device 212.

Further referring to FIG. 2, the communication devices 211-215 are divided into multiple groups according to their locations, and for example, a k nearest neighbor algorithm can be used to automatically dividing the communication devices 211-215 into multiple groups. When one the communication devices (such as, 211) of a first group transmits the packet to the central communication device 22, the other communication devices 212 and 213 of the first group receives and temporally stores the packet transmitted by the communication device 211. Since the communication devices 214 and 215 of a second group are far away from the communication devices 211-213, the packet transmitted by the communication device 211 is not received and temporally stored by the communication devices 214 and 215. In the exemplary embodiment, it can be known that the other one communication device (such as, 212 or 213) in the same group (i.e. first group) can help the communication device 211 to retransmit the lost packet which the communication device 211 fails to successfully transmit to central communication device 22.

It is also noted that, the manner of the division (or grouping) of the communication devices 211-215 is not used to limit the present disclosure, and in another one exemplary embodiment, the communication devices 211-215 can be divided into more than two groups (i.e. the number of the groups is not used to limit the present disclosure) according to at least one of successful retransmission rates, locations, packet error rates, received signal strength indications, signal to noise ratios of the communication devices 211-215. The successful retransmission rates of the communication devices 211-215 means that the successful rates which the packets are retransmitted by the communication devices 211-215.

Figure 4:
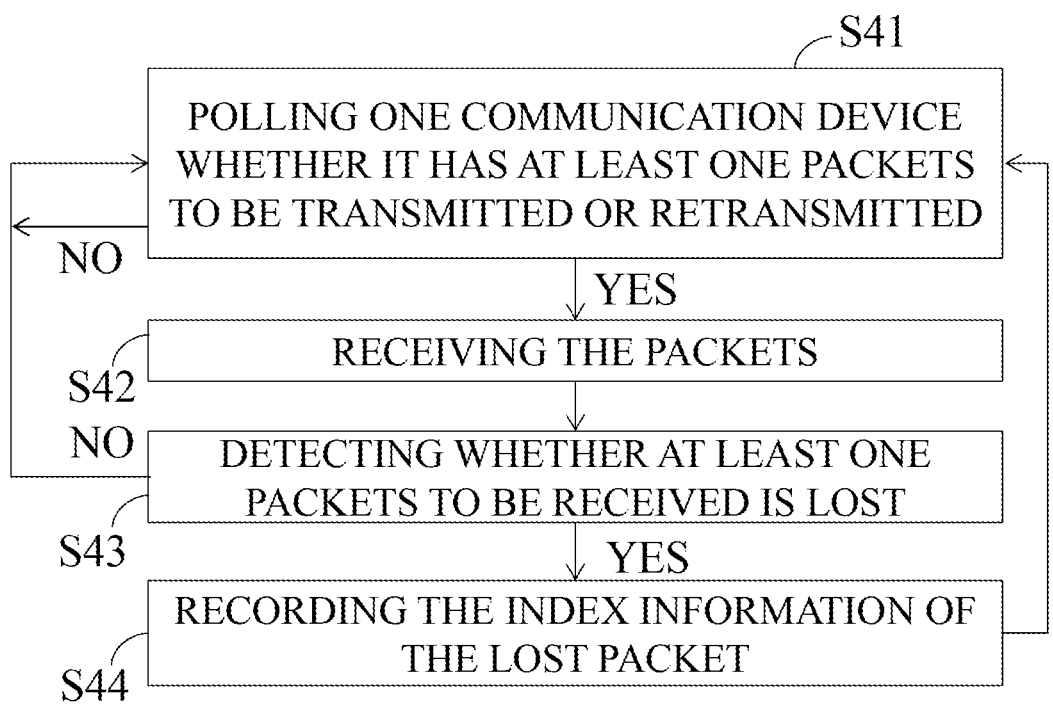
FIG. 4 is a flow chart of a wireless data transmission method according to an exemplary embodiment of the present disclosure.

Referring to FIG. 4, FIG. 4 is a flow chart of a wireless data transmission method according to an exemplary embodiment of the present disclosure. Though the flow chart of FIG. 4 describes the operations of the central communication device, the operations of the communication devices can be understood by the descriptions of FIG. 4. At step S41, one of the communication devices is polled by the central communication device whether communication device has at least one packet to be transmitted or retransmitted to the central communication device. If the communication device has at least one packet to be transmitted or retransmitted, step S42 is executed; otherwise, step S41 is executed again to poll another one of the communication devices.

At step S42, the central communication device receives the packets transmitted or retransmitted by the communication device. Then, at step S43, the central communication device detects whether at least one packet transmitted or retransmitted by the communication device is lost (i.e. not successfully received by the central communication device). If at least one packet transmitted or retransmitted by the communication device is lost, step S44 is executed; otherwise, step S41 is executed to poll another one communication device.

At step S44, the central communication device records the index information of the lost packet (for example, packet number of the lost packet the communication device), and then step S41 is executed to poll another one communication device. Since, the central communication device records the index information of the lost packet, when polling another one communication device, the central communication device can make the other one communication device know whether it has the lost packet to be retransmitted to the central communication device.

It is noted that, in another one exemplary, step S44 can be replaced by that the central communication device broadcasts an notification message of the lost packet to at least one portion of the communication devices, and thus the other one communication device can know whether it has the lost packet to be retransmitted to the central communication device according to the notification message.

By the way, to achieve the higher retransmission efficiency of packet loss, merely the communication device with the successful retransmission rate being larger than a threshold percentage (such as, 95%) is determined to retransmit the lost packet. To achieve the priority demand, if the communication device has the lost packet with the higher priority, the communication device retransmit the lost packet, regardless the communication device may have the poor signal to noise ratio or is more far away from the central communication device.

In addition, it is noted that, in one exemplary embodiment, the time slots can be allocated to the communication devices according to at least one of successful retransmission rates, locations, packet error rates, received signal strength indications, signal to noise ratios of the communication devices.

Back to refer FIG. 2, though the exemplary embodiment which uses the polling mechanism is illustrated, the present disclosure is not limited thereto. In another one embodiment, the wireless data communication system 2 uses an interruptive request mechanism. The central communication device 22 can control the one of communication devices 211-215 (for example, the communication device 214) to transmit or retransmit the packet and the others of the communication devices 211-215 (for example, the communication device 211-213 and 215) to be silent.

For example, the central communication device 22 requests the communication device 214 to transmit one more packets to the central communication device 22, and when the central communication device 22 determines one packet transmitted by the communication device 214 is lost, the central communication device 22 interrupts a data transmission of the communication device 214, and requests the communication device 215 which has the lost packet to retransmit the lost packet to the central communication device 22. After the central communication device 22 successfully receives the lost packet retransmitted by the communication device 215, the central communication device 22 interrupts a data transmission of the communication device 215, and requests the communication device 214 transmit the packet next to the lost packet.

To sum up, without disposing any relay device or repeater, the wireless data communication system and method of the present disclosure can enhance the retransmission efficiency of packet loss and further improve the transmission efficiency. Furthermore, the system architecture and algorithm of operations of the wireless data communication system are not complicated, which can be easily implemented without adding expensive cost, and therefore, the present disclosure has economic benefits in the field of the wireless data transmission.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A wireless data communication system, comprising:
   a central communication device; and
   a plurality of communication devices including a first communication device and a second communication device, each of them being capable of communicating with the central communication device to respectively transmit one or more packets;
   wherein the central communication device requests the first communication device to transmit the one or more packets of the first communication device to the central communication device; if the central communication device determines the one or more packets of the first communication device are lost during transmission, and the second communication device receives the one or more lost packets of the first communication device, the second communication device retransmits the one or more lost packets of the first communication device to the central communication device after being requested by the central communication device;
   wherein the central communication device allocates a plurality of time slots to the first communication device and the second communication device, merely the first communication device is requested within its allocated time slots to transmit its one or more packets or retransmit one or more lost packets of the first or second communication device, and merely the second communication device is requested within its allocated time slots to transmit its one or more packets or retransmit one or more lost packets of the first or second communication device;
   wherein numbers of the time slots allocated to the first communication device and the second communication devices are different, and the time slots are allocated to the first communication device and the second communication device according to at least one of successful retransmission rates, locations, packet error rates, received signal strength indications, signal to noise ratios of the first communication device and the second communication device.

2. The wireless data communication system according to claim 1, wherein the first communication device retransmits the one or more lost packets of the communication device to the central communication device when the communication device is notified that the one or more packets of the first communication device are lost, and the second communication device retransmits the one or more lost packets of the first communication device if the one or more lost packets of the first communication device are not successfully retransmitted by the first communication device.

3. The wireless data communication system according to claim 1, wherein if a central communication device determines the one or more packets of the first communication device requested by and transmitted to the central communication device is lost during transmission, the central communication device broadcasts a notification message of the one or more lost packets of the first communication device to the at least one portion of the communication devices.

4. The wireless data communication system according to claim 1, wherein the central communication device records information which the second communication device is able to retransmit the one or more lost packets of the first communication device.

5. The wireless data communication system according to claim 1, wherein the central communication device determines whether to request the second communication device which receives the one or more lost packets of the first communication device to retransmit the one or more lost packets of the first communication device to the central communication device according to at least one of a priority of the one or more lost packets of the first communication device, a packet error rate, a successful retransmission rate, a location, a packet error rate, a received signal strength indication, a signal to noise ratio of the second communication device.

6. A wireless data transmission method, used in a wireless data communication system which comprises a central communication device and a plurality of communication devices, wherein the plurality of communication devices comprises a first communication device and a second communication device, each of them being capable of communicating with the central communication device to respectively transmit one or more packets, and the wireless data transmission method comprising:
   requesting, by the central communication device, the first communication device to transmit the one or more packets of the first communication device to the central communication device; and
   if the central communication device determines the one or more packets of the first communication device is lost during transmission, and the second communication device receives the one or more lost packets of the first communication device, requesting, by the central communication device, the second communication device to retransmit the one or more lost packets of the first communication device to the central communication device after being requested by the central communication device;
   wherein the central communication device allocates a plurality of time slots to the first communication device and the second communication device, merely the first communication device is requested within its allocated time slots to transmit its one or more packets or retransmit one or more lost packets of the first or second communication device, and merely the second communication device is requested within its allocated time slots to transmit its one or more packets or retransmit one or more lost packets of the first or second communication device;

wherein numbers of the time slots allocated to the first communication device and the second communication devices are different, and the time slots are allocated to the first communication device and the second communication device according to at least one of successful retransmission rates, locations, packet error rates, received signal strength indications, signal to noise ratios of the first communication device and the second communication device.

7. The wireless data communication method according to claim 6, wherein the first communication device retransmits the one or more lost packets of the communication device to the central communication device when the communication device is notified that the one or more packets of the first communication device are lost, and the second communication device retransmits the one or more lost packets of the first communication device if the one or more lost packets of the first communication device are not successfully retransmitted by the first communication device;

wherein the central communication device allocates a plurality of time slots to the first communication device and the second communication device, merely the first communication device is requested within its allocated time slots to transmit its one or more packets or retransmit one or more lost packets of the first communication device, and merely the second communication device is requested within its allocated time slots to transmit its one or more packets or retransmit one or more lost packets of the second communication device;

wherein numbers of the time slots allocated to the first communication device and the second communication devices are different, and the time slots are allocated to the first communication device and the second communication device according to at least one of successful retransmission rates, locations, packet error rates, received signal strength indications, signal to noise ratios of the first communication device and the second communication device.

8. The wireless data communication method according to claim 6, wherein if a central communication device determines the one or more packets of the first communication device requested by and transmitted to the central communication device is lost during transmission, the central communication device broadcasts a notification message of the one or more lost packets of the first communication device to the at least one portion of the communication devices.

9. The wireless data communication method according to claim 6, wherein the central communication device records information which the second device is able to retransmit the one or more lost packets of the first communication device.

10. The wireless data communication method according to claim 6, wherein the central communication device determines whether to request the second communication device which receives the one or more lost packets of the first communication device to retransmit the one or more lost packets of the first communication device to the central communication device according to at least one of a priority of the one or more lost packets of the first communication device, a packet error rate, a successful retransmission rate, a location, a packet error rate, a received signal strength indication, a signal to noise ratio of the second communication device.

* * * * *